United States Patent
Nelson et al.

(10) Patent No.: US 11,953,998 B1
(45) Date of Patent: Apr. 9, 2024

(54) TRUSTED BACKUP OF COMPUTER INCLUDING OPERATING SYSTEM, FIRMWARE, AND ESSENTIAL DATA

(71) Applicant: T-MOBILE INNOVATIONS LLC, Overland Park, KS (US)

(72) Inventors: Tracy L. Nelson, Overland Park, KS (US); Lyle W. Paczkowski, Mission Hills, KS (US); William M. Parsel, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 771 days.

(21) Appl. No.: 17/075,647

(22) Filed: Oct. 20, 2020

(51) Int. Cl.
*G06F 16/10* (2019.01)
*G06F 11/14* (2006.01)
*G06F 11/20* (2006.01)
*G06F 21/53* (2013.01)
*H04W 24/04* (2009.01)

(52) U.S. Cl.
CPC ...... *G06F 11/1464* (2013.01); *G06F 11/1451* (2013.01); *G06F 11/1469* (2013.01); *G06F 11/2056* (2013.01); *G06F 21/53* (2013.01); *H04W 24/04* (2013.01); *G06F 2201/84* (2013.01); *G06F 2212/1032* (2013.01); *G06F 2212/154* (2013.01)

(58) Field of Classification Search
None
See application file for complete search history.

(56) References Cited

U.S. PATENT DOCUMENTS

| 6,360,330 | B1 * | 3/2002 | Mutalik | G06F 11/1466 |
| | | | | 707/999.003 |
| 9,282,898 | B2 | 3/2016 | McRoberts et al. | |
| 2018/0081666 | A1 * | 3/2018 | Surdu | G06F 21/572 |
| 2021/0182160 | A1 * | 6/2021 | Sharma | G06F 11/1451 |
| 2022/0121525 | A1 * | 4/2022 | Brenner | G06F 16/185 |

FOREIGN PATENT DOCUMENTS

WO  WO-2017190758 A1 * 11/2017 .......... G06F 11/1438

* cited by examiner

*Primary Examiner* — Jau Shya Meng

(57) ABSTRACT

A method of restoring an image of a computer, including identifying, by a backup application executing on the computer, artifacts of the computer to back up, creating a mirror image of a hard drive of the computer, wherein the mirror image comprises the artifacts, establishing a local environment within the computer, communicating with a backup server, by the backup application, using the local environment in the computer, backing up the mirror image, by the backup application, to the backup server using the local environment, updating the mirror image, by the backup application, in the backup server in response to a change in the computer, constructing the local environment on the computer in response to an event, loading a program from the local environment, and restoring the computer, by the backup application, from the mirror image in the backup server based on the artifacts, the program, and the restore process.

20 Claims, 8 Drawing Sheets

TRUSTED BACKUP OF COMPUTER INCLUDING OPERATING SYSTEM, FIRMWARE, AND ESSENTIAL DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computers are widely deployed and used by people in all walks of life in the United States and other nations. People can access the Internet and download content via browsers executing on their computers. Additionally, applications or computer programs may be installed on the computer. When executed, the applications may process autonomously on the computer device. The applications may also interact with application servers that assist the applications in some ways. In some cases, the application may be deployed as a client having limited capabilities that executes on the computer that interworks with a server application that executes on a server computer accessible via a network from the computer. Computers may have an operating system (OS) installed that provides an execution environment. This OS may constrain or limit what mobile applications are able to do.

SUMMARY

In an embodiment, a method of restoring an image of a computer, includes identifying artifacts of the computer to back up, creating a mirror image of a hard drive of the computer, wherein the mirror image comprises the artifacts, establishing a local environment within the computer, communicating with a backup server using the local environment in the computer, backing up the mirror image to the backup server using the local environment, updating the mirror image in the backup server in response to a change in the computer, constructing the local environment on the computer in response to an event, loading a program from the local environment, wherein the program instantiates a restore process for the computer, and restoring the computer from the mirror image in the backup server based on the artifacts, the program, and the restore process.

In another embodiment, a computer, includes a processor, and a memory coupled to the processor and storing instructions that, when executed by the processor, cause the computer to be configured to identify artifacts of the computer to back up, create a mirror image of a hard drive of the computer, wherein the mirror image comprises the artifacts, establish a local environment within the computer, communicate with a backup server using the local environment in the computer, back up the mirror image to the backup server using the local environment, and update the mirror image in the backup server in response to a change in the computer.

In yet another embodiment, a method for backing up information, implemented by a mobile communication device, includes identifying artifacts of the mobile communication device to back up, creating a mirror image of a hard drive of the mobile communication device, wherein the mirror image comprises the artifacts, establishing a local environment within the mobile communication device, communicating with a backup server using the local environment in the mobile communication device, backing up the mirror image to the backup server using the local environment, and updating the mirror image in the backup server in response to a change in the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
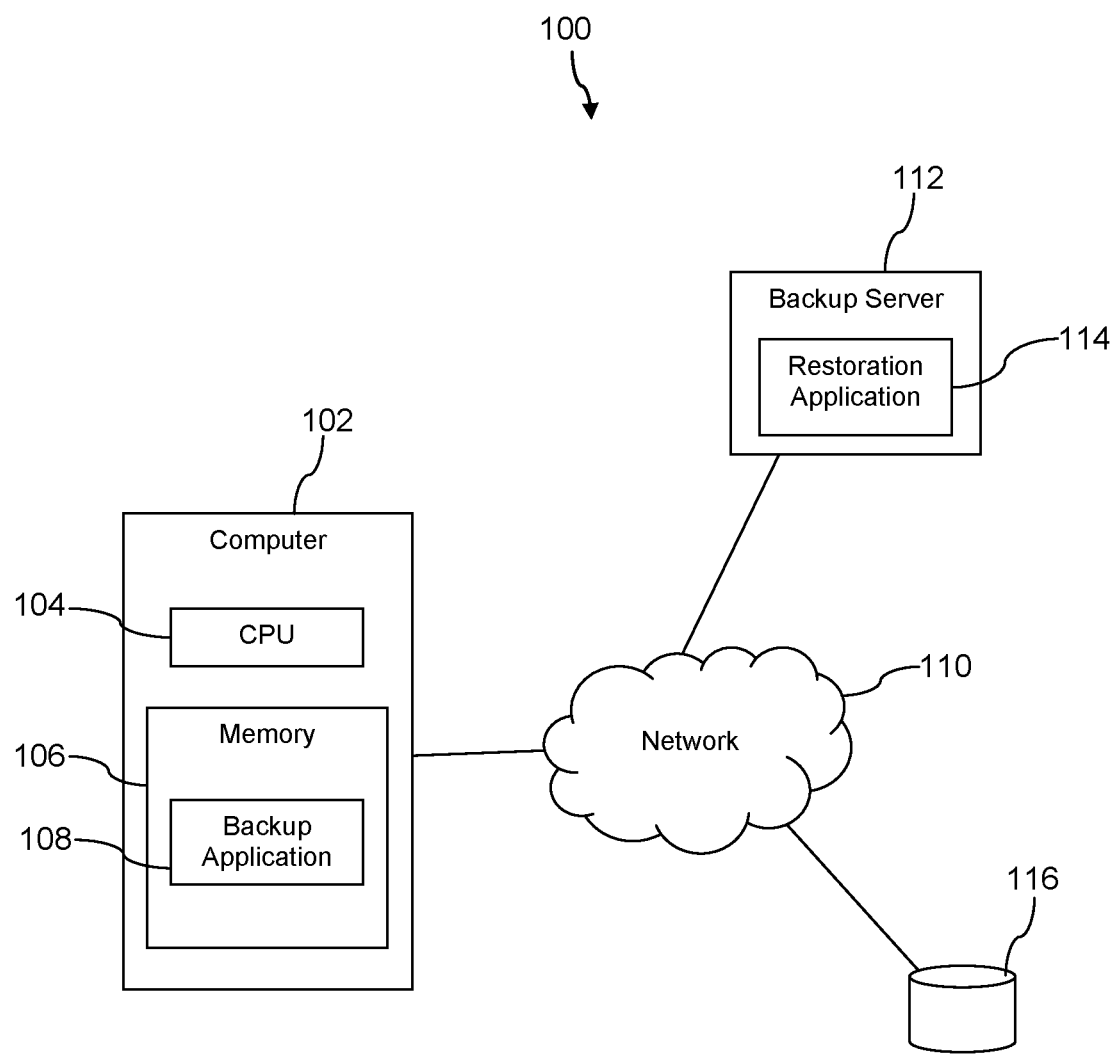
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches backup device artifacts of a computer system to promote rebuilding the computer. This backup may be completed, in part, using a trustlet executing in a local environment on the computer. A local environment is an execution environment in the computer which executes code and exists within an OS. For example, a trusted execution environment (TEE), in which, executing the code can have high levels of trust in the asset management of that surrounding environment because it can ignore threats from the rest of the device. The backup may take place periodically and can conduct the backup with deltas, where deltas update the backup by determining what has changed, determining that the change was due to a legitimate process, and storing the change and not the whole binary. The backup may be stored via a fifth generation (5G) network slice. The present disclosure teaches the restoration of a computer from the backup. Part of the restoration process can involve first building a TEE on the raw computer, installing the trustlet in the TEE, and completing the restoration by the operation of the trustlet. This disclosure incorporates different method from the conventional approach of backing up computers and mobile communication devices based on backing up various device artifacts, such as the OS and the firmware artifacts; backing up from the TEE without relying upon conventional OS services, utilities, or system calls executing outside the TEE; and in restoring these artifacts from the TEE.

Providing a flexible method to backup and restore devices could be advantageous as shown in the following examples. A first example is overcoming a cryptographic ransomware threat that may affect any user. The problem with computers backed up with conventional backups—where only application data and files are backed up—is that the hacker cryptographically locks down the OS of the computer thereby making the computer unusable. Sometimes it is not feasible, for various reasons such as sloppy hacking, to simply wipe the hard drive and rebuild the OS from scratch. A second example is when a hacker locks up images on a mobile phone. This type of extortion event would require the hacker to encrypt the mobile phone at the OS level, and a simple wipe of the device could not restore the device to the previous settings that were used prior to the extortion event. In this example, even if the images were stored on the cloud, the encryption of the OS would deny cloud access to the user. A third example is when a hacker uses a Distributed Denial of Service (DDoS) attack on a public infrastructure to extort a government entity out of money, or else be victim of a mass data wipe out. Recent attacks on public governments around the world echo the need for a proper counter measure. To counter this type of event, the method in this application may be used to allow the public infrastructure to back up the firmware and OS of the each node to avoid having to pay the extortion fee or have the data wiped.

The present disclosure teaches a computer restoration that is not feasible in other approaches. Specifically, the restoration system and method taught herein provides backup of device artifacts that are lacking in conventional backups, the backing up is from the TEE without relying upon conventional OS services, utilities, or system calls executing outside the TEE, and restoring these artifacts from the TEE. The aforementioned device artifacts are useful for because restoration from device artifacts—rather than files as in other approaches—can capture both the hardware and software components of the device, which is typically where adversaries target. Restoring from the artifacts insures the structural integrity of the device has remained the same such that updates are not coming from, or reinstalls are not being made back onto, a compromised structure allowing intrusion at layers normally assumed safe. Contrast this with the example in current approaches, if an adversary who attacks the device destroys the kernel and improperly pushes the cryptographic key, then the adversary can further harm the device when it comes back online because the port is now compromised. The artifacts may comprise firmware, the kernel, the children of kernel, and any discretionary data, where the discretionary data does not include email because one can restore email otherwise. This disclosure teaches a solution needed by the community as a whole to counter the ever growing threat to private, corporate, and governmental data.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete TEE may be implemented through the use of the trusted security zone hardware and software architecture. The TEE is an execution environment that is parallel to the execution environment of the main mobile device OS. The TEE and/or the trusted security zone may provide a base layer of functionality and/or utilities for use of applications that may execute in the trusted security zone. For example, in an embodiment, trust tokens may be generated by the base layer of functionality and/or utilities of the TEE and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the TEE becomes a place to which scalable deployment of secure services can be targeted. A device which has a chipset that has a TEE on it may exist in a trusted services environment, where devices in the trusted services environment are trusted and protected against attacks. The TEE can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the TEE, the main mobile OS in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an API in the TEE on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate OS that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition OS runs in a virtual processor separate from the normal partition OS that likewise executes in its own virtual processor. Users may install applications on the mobile device which may execute in the normal partition OS described above. The trusted security zone runs a separate OS for the secure partition that is installed by the mobile device manufacturer or vendor, and users are not able to install new applications in or alter the contents of the trusted security zone.

In FIG. 1, a system 100 is described. In an embodiment, the system 100 comprises a computer 102 comprising a central processor unit (CPU) 104, a memory 106, and a backup application 108 stored in a non-transitory portion of the memory 106. In an embodiment, a portion of the memory 106 may be non-transitory memory and a portion of the memory 106 may be transitory memory. The computer 102 may be able to establish a communication link to a network 110. The network 110 is one or more public networks, one or more private networks, or a combination thereof. The computer 102 communicates via the network 110 to a backup server 112 communicatively coupled to the network 110, where the backup server 112 comprises a restoration application 114. Communication between the computer 102 and the restoration application 114 allows the computer 102 to perform a device backup.

While the computer 102 is typically a personal computer (PC), it is understood that the system 100 may comprise a server computer, a cell phone, a smart phone, a wearable computer, laptop computer, tablet computer, notebook, and/or the like. The network 110 may comprise one or more private networks, one or more public networks, or a combination thereof.

In an embodiment, the backup application 108 identifies artifacts to back up depending on the type of device. If the device is a PC, then the artifacts may comprise information regarding a micro kernel, a monolithic kernel, a hybrid kernel, a terminal controller, a device controller, a memory controller, a CPU scheduler, a virtual memory, shells, a compiler, and/or network access. Further, at the general OS level, the artifacts further comprise information regarding application programs, resident system programs, device drivers, and read-only memory (ROM) basic input/output system (BIOS) device drivers. If the device is a mobile communication device, then the artifacts may comprise information regarding system components, OS services, system calls, system programs, system structure, virtual machines, system design and implementation, Permanent Equipment Identifier (PEI), an International Mobile Equipment Identity (IMEI), a General Public Subscription Identifier (GPSI), a Mobile Station International Subscriber Directory Number (MSISDN), a Subscriber Permanent Identifier (SUPI), an International Mobile Subscriber Identity (IMSI), a Network Access Identifier (NAI), a Sub Concealed Identifier (SUCI), a 5G-Temporary Mobile Subscriber Identifier (5G-TMSI), 5G-Globally Unique Temporary Identifier (5G-GUTI), and/or a Globally Unique Access and Mobility Management Function (AMF) Identifier (GUAMI). After determining these artifacts, the backup application 108 creates a mirror image of a hard drive, wherein the mirror image comprises the artifacts. The backup application 108 communicates, through the network 110, with a backup server 112 using a TEE established in the computer 102. After the backup application 108 and the backup server 112 establish a trusted communication session, the backup server 112 prompts the restoration application 114 to store the mirror image of the computer 102. The backup application 108 backs up the mirror image to the backup server 112 using the TEE, wherein the backing up does not rely on services, utilities, and system calls outside of the TEE. The restoration application 114 passes the mirror image of the backup to the database 116 for storage. The backup application 108 sends updates of the mirror image to the backup server 112 in response to a delta (or a change in the computer 102). When the computer 102 desires the backup to restore itself, the backup application 108 requests the backup from the backup server 112. The backup server 112 validates whether the backup application 108 has access to the backup. After validating backup application 108, the backup server 112 prompts the computer 102 to construct the TEE. The backup server 112 sends the computer 102 a trustlet to restore the mirror image. In an embodiment, the trustlet is a portion of the backup application 108 that is stored in a trusted portion of the memory 106. The computer 102 then loads the trustlet within the TEE, wherein the trustlet instantiates a restore process for the computer 102. The backup application 108 restores the computer 102 from the mirror image based on the artifacts and the trustlet.

In an alternate embodiment, the backup application 108 identifies artifacts to back up such as the firmware, the OS, and other identifying parameters of the computer 102. After determining these artifacts, the backup application 108 creates a mirror image of a hard drive, wherein the mirror image comprises the artifacts. The backup application 108 communicates via the network 110, with a backup server 112 using a TEE in the computer 102. After the computer 102 and the backup server 112 establish communication, the backup server 112 prompts the restoration application 114 to be ready to store the backup of the computer 102. The backup application 108 backs up the mirror image to the backup server 112 using the TEE, wherein the backing up does not rely on services, utilities, and system calls outside of the TEE. The restoration application 114 passes the mirror image of the backup to the database 116 for storage. The backup application 108 sends updates of the mirror image to the backup server 112 in response to a delta (or a change in the computer 102). When the computer 102 desires the backup to restore itself, the backup application 108 requests the backup from the backup server 112. The backup server 112 validates whether the backup application 108 has access to the backup. After validating the backup application 108, the backup server 112 prompts the computer 102 to construct the TEE. The backup server 112 sends the computer 102 the artifacts the computer 102 needs to restore itself. The backup application 108 receives the artifacts and restores the computer 102 based on the firmware, the OS, and other identifying parameters.

In an alternate embodiment, the backup application 108 identifies artifacts to back up. After determining the artifacts, the backup application 108 creates a mirror image of a hard drive, wherein the mirror image comprises the artifacts. The backup application 108 communicates, through the network 110, with a backup server 112 using a TEE established in the computer 102. The backup server 112 validates whether the backup application 108 has access to the backup. The validation of the backup application 108 may be dependent on whether a user of the computer 102 has an appropriate subscription to store the mirror image on the backup server 112. After the backup server 112 validates the backup application 108, the backup server 112 prompts the restoration application 114 to store the mirror image of the computer 102. The backup application 108 backs up the mirror image to the backup server 112 using the TEE, wherein the backing up does not rely on services, utilities, and system calls outside of the TEE. The restoration application 114 passes the mirror image of the backup to the database 116 for storage. The backup application 108 sends updates of the mirror image to the backup server 112 in response to a delta (or a change in the computer 102). When the computer 102 requires the backup to restore itself, the backup application 108 requests the backup from the backup server 112. The backup server 112 again validates whether the backup application 108 has access to the backup. After validating the backup application 108, the backup server 112 prompts the computer 102 to construct the TEE. The backup server 112 sends the backup application 108 a trustlet to restore the mirror image. The backup application 108 then loads the trustlet within the TEE, wherein the trustlet instantiates a restore process for the computer 102. The backup application 108 restores the computer 102 from the mirror image based on the artifacts and the trustlet.

Figure 2:
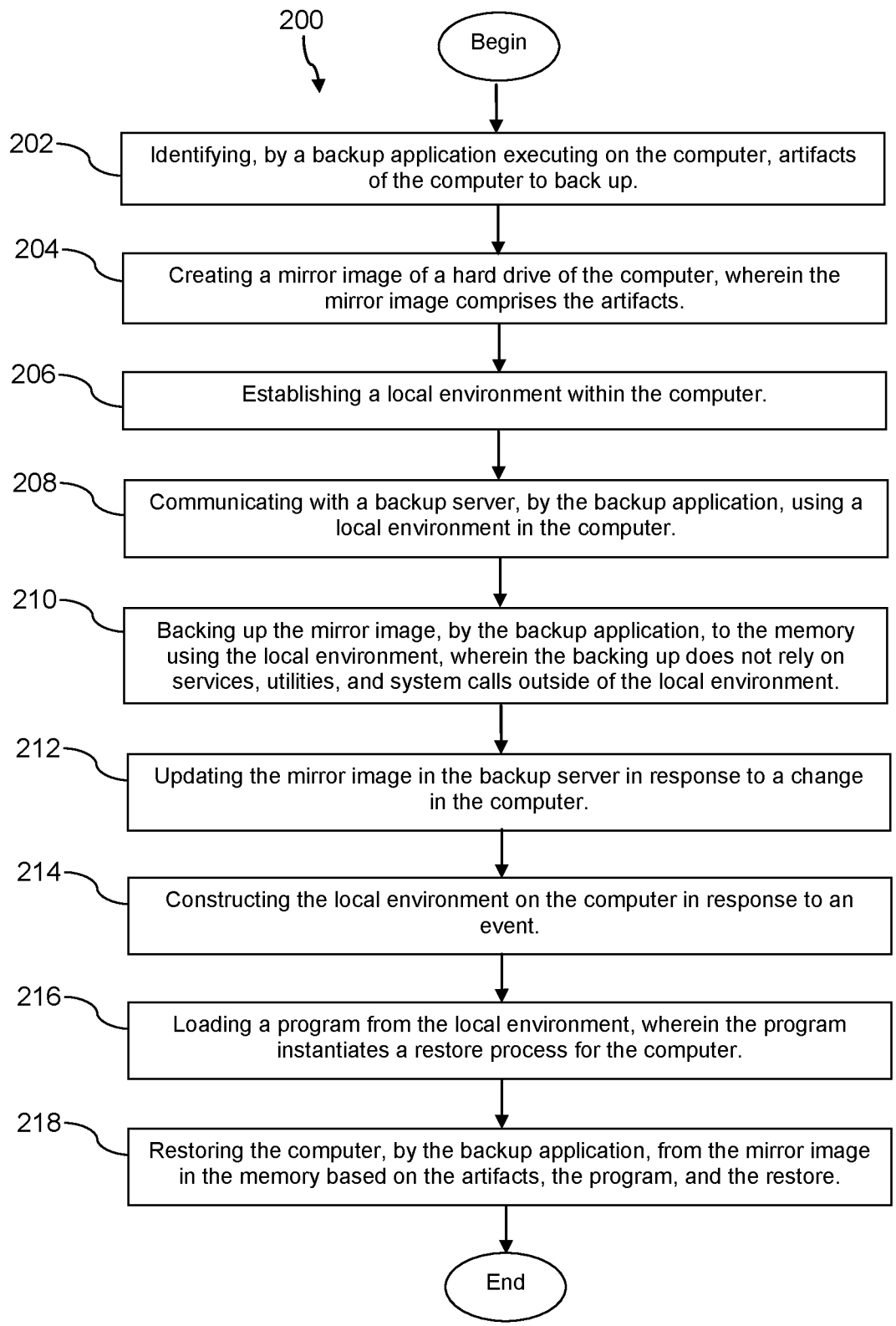
FIG. 2 is a flow chart of a method according to an embodiment of the disclosure.

FIG. 2 illustrates a method 200 of restoring an image of a computer. In an embodiment, the method 200 is implemented by an application executing on a computer. For example, the method 200 may be executed by the backup application 108 described above with reference to FIG. 1. At block 202, the method 200 comprises identifying, by a backup application executed on the computer, artifacts of the computer to back up. At block 204, the method 200 comprises creating a mirror image of a hard drive of the computer by the backup application, wherein the mirror image comprises the artifacts. At block 206, the method 200 comprises establishing a local environment within the computer. At block 208, the method 200 comprises communicating with a backup server by the backup application using a local environment in the computer. At block 210, the method 200 comprises backing up the mirror image to the memory using the local environment, wherein the backing up does not rely on services, utilities, and system calls outside of the local environment. At block 212, the method 200 comprises updating the mirror image in the backup server by the backup application in response to a change in the computer.

At block 214, the method 200 comprises constructing the local environment on the computer in response to an event. At block 216, the method 200 comprises loading a program from the local environment, wherein the program instantiates a restore process for the computer. At block 218, the method 200 comprises restoring the computer from the mirror image in the memory based on the artifacts, the program, and the restore process.

Figure 3:
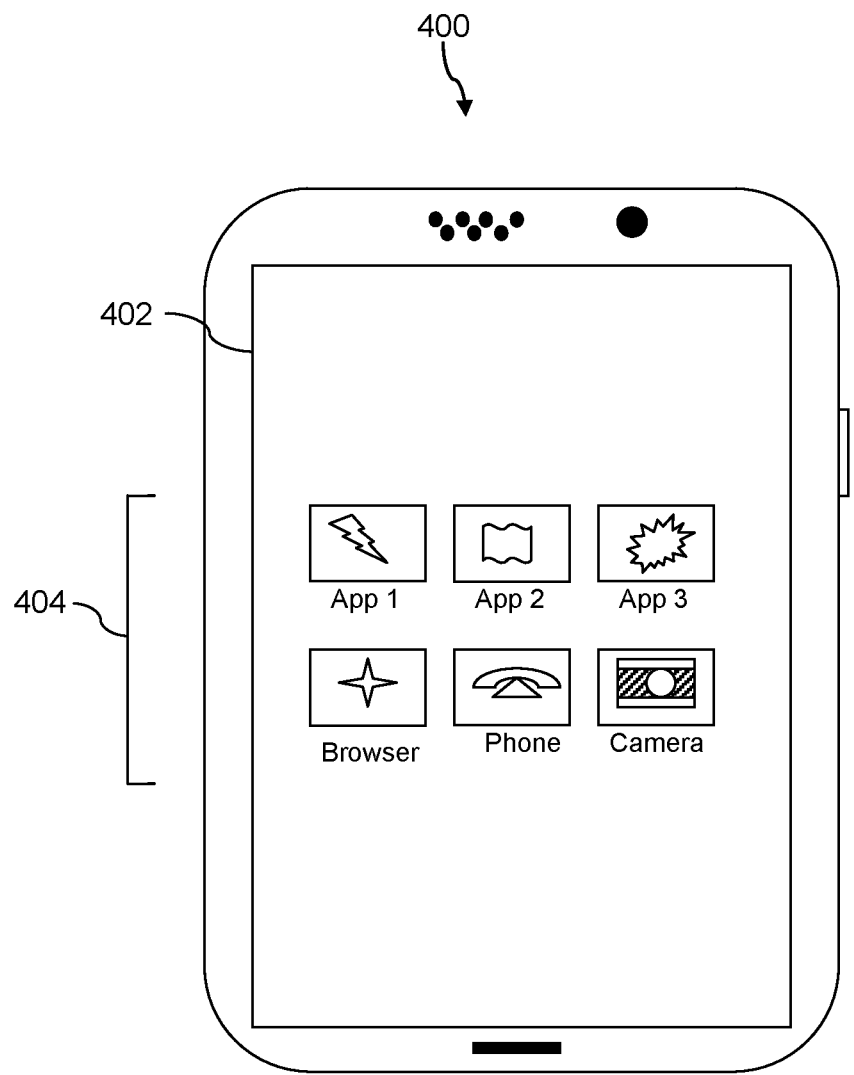
FIG. 3 is an illustration of a mobile communication device according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
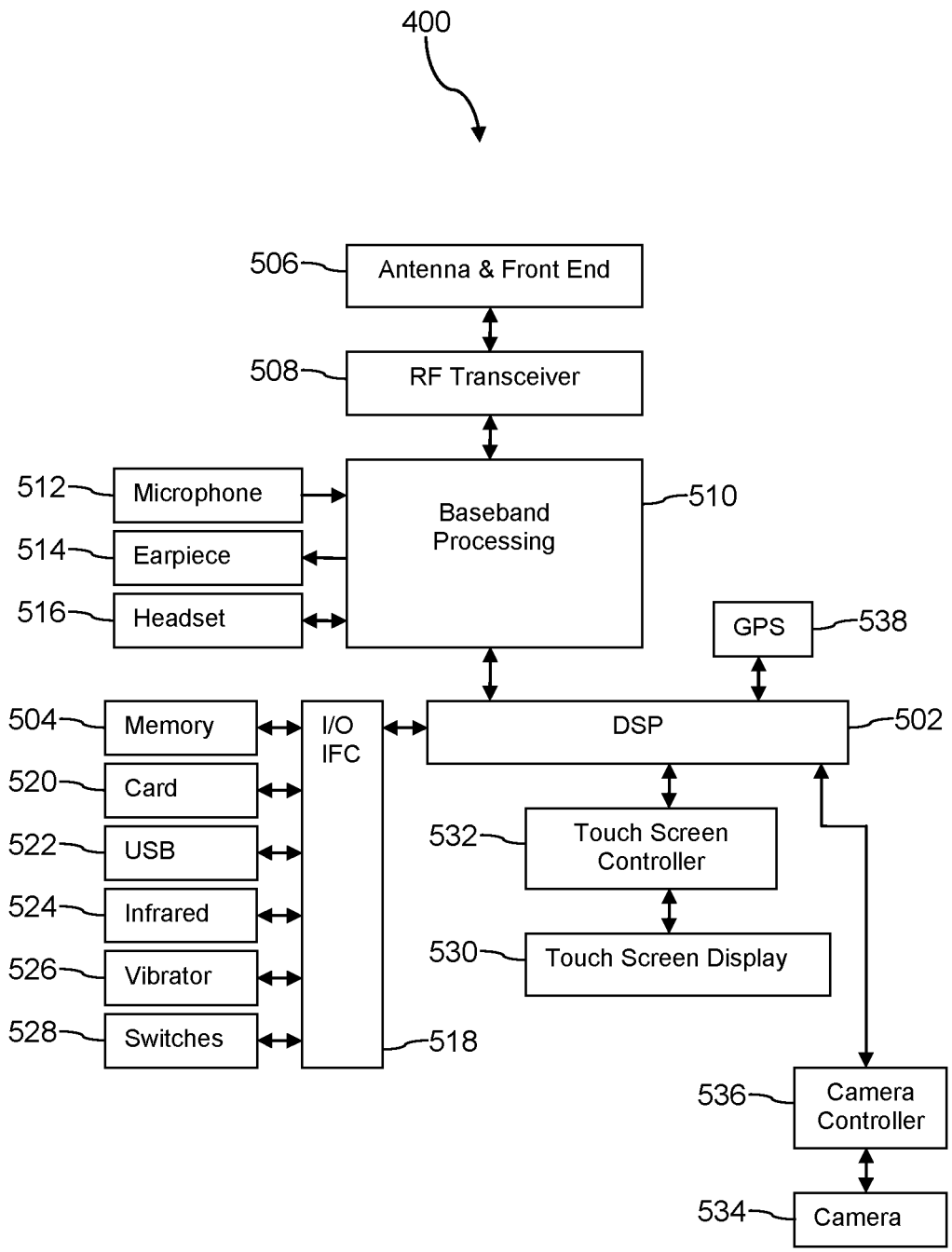
FIG. 4 is a block diagram of hardware architecture of a mobile communication device according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
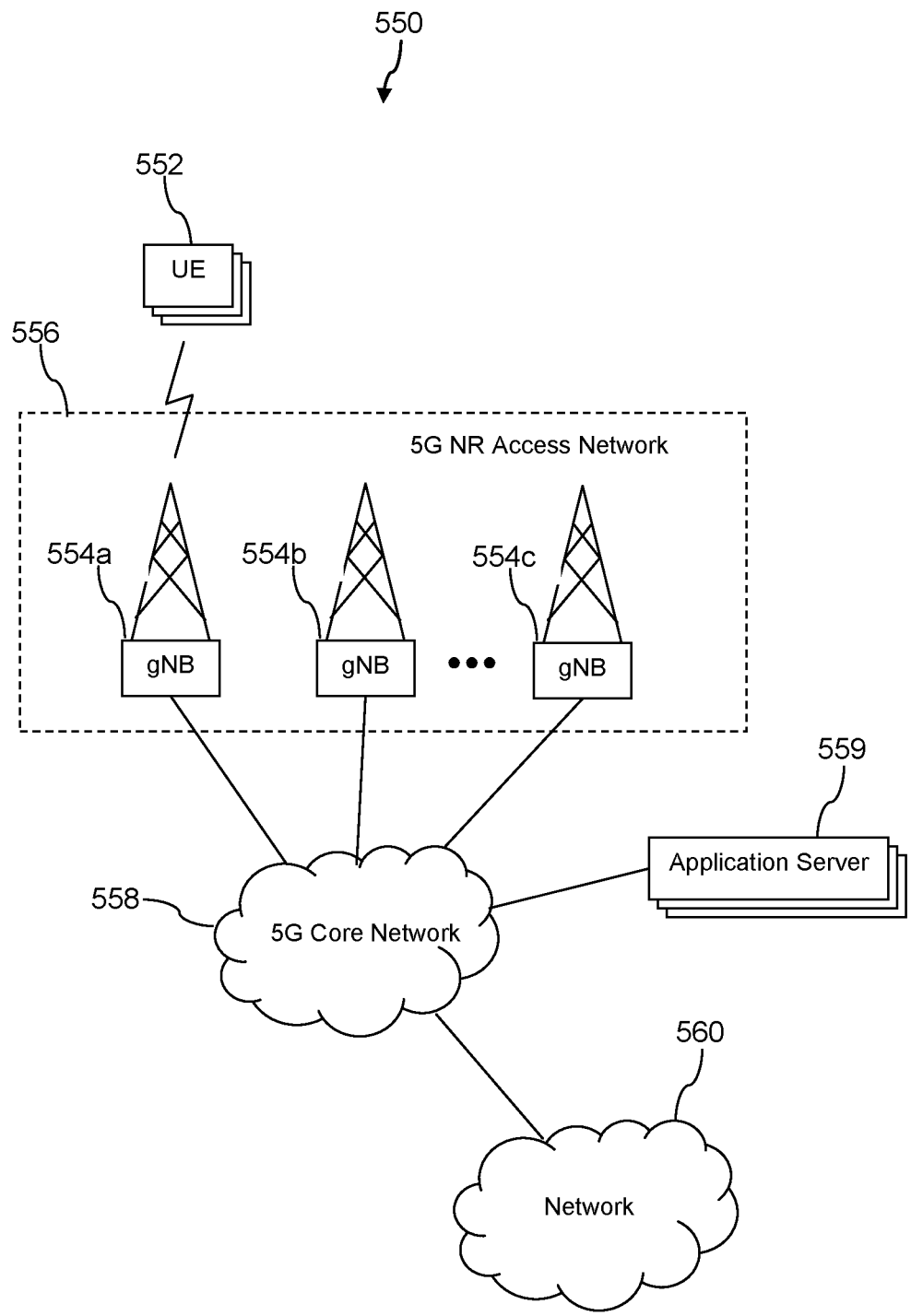
FIG. 5A is an exemplary communication system according to an embodiment of this disclosure.

Turning now to FIG. 5A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (.e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 10 gigabits per second (gbps) downlink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

Figure 5B:
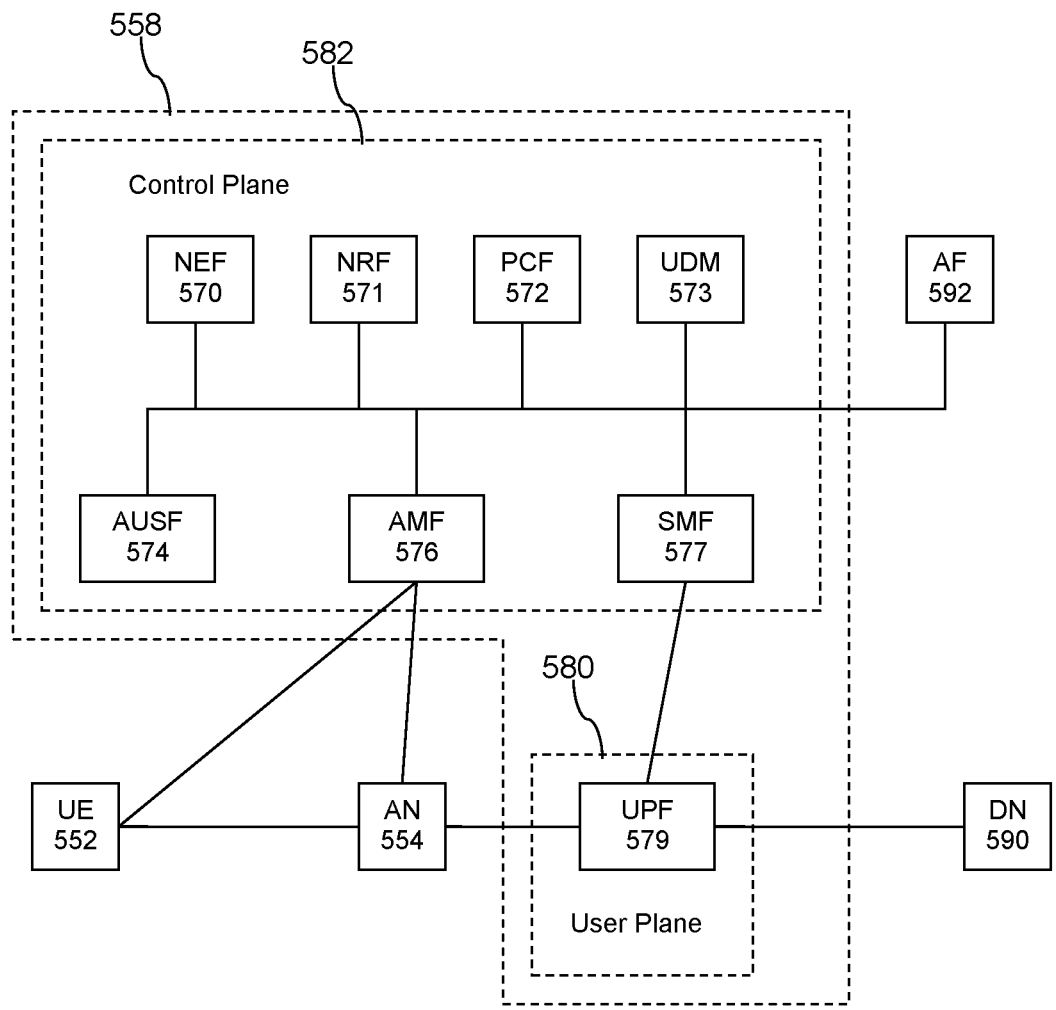
FIG. 5B is a core network according to an embodiment of this disclosure.

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 574, an access and mobility management function (AMF) 576, a session management function (SMF) 577, a network exposure function (NEF) 570, a network repository function (NRF) 571, a policy control function (PCF) 572, a unified data management (UDM) 573, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access node 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 574 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer.

Figure 6A:
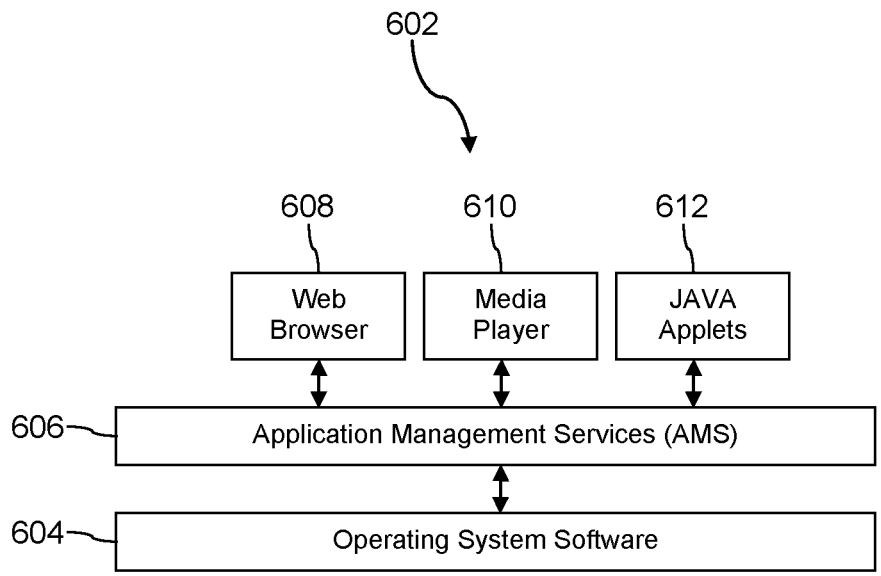
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
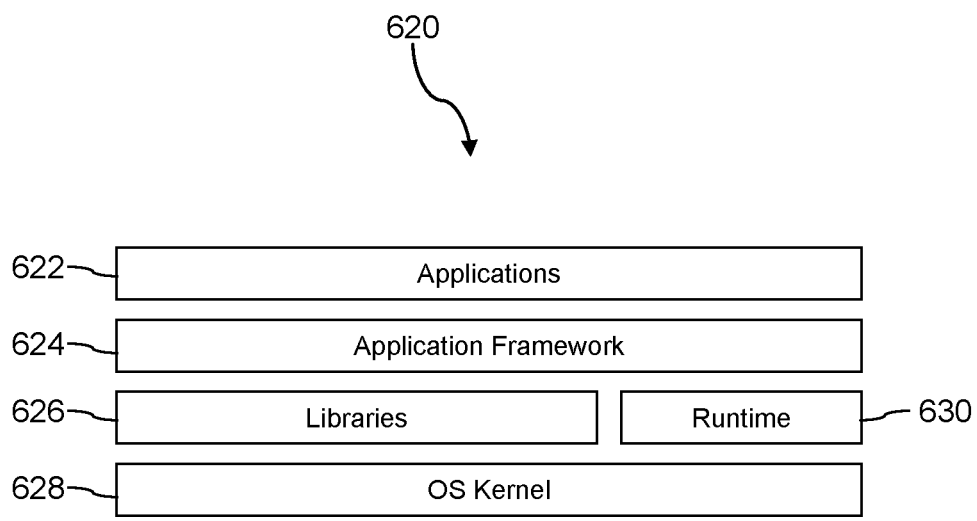
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
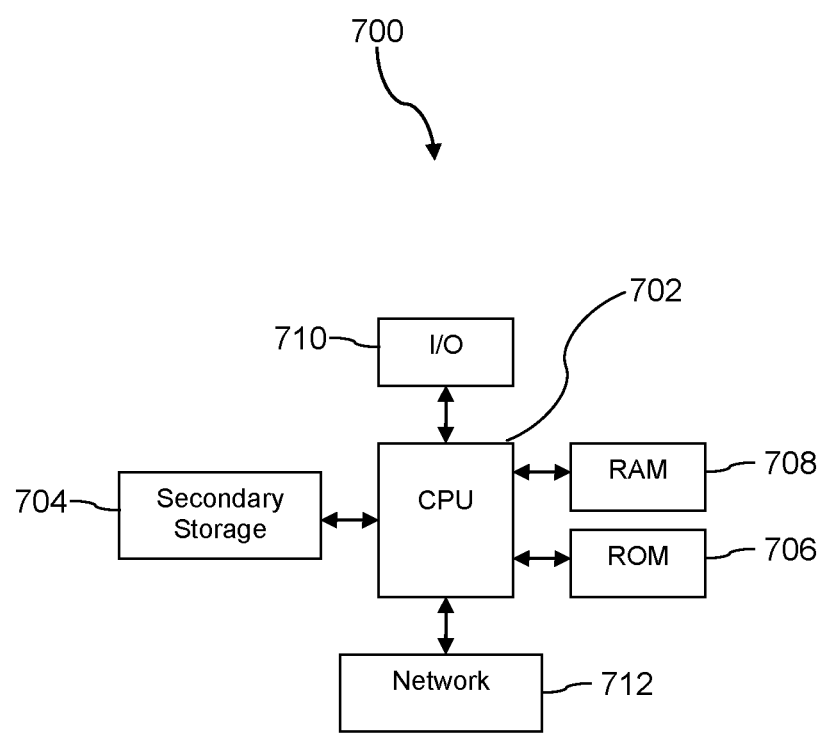
FIG. 7 is a block diagram of a computer system according to an embodiment of the disclosure.

FIG. 7 illustrates a computer system 700 suitable for implementing one or more embodiments disclosed herein. For example, in an embodiment, the backup server 112 described above may be implemented in a form similar to that of computer system 700. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 702 may execute a computer program or application. For example, the CPU 702 may execute software or firmware stored in the ROM 706 or stored in the RAM 708. In some cases, on boot and/or when the application is initiated, the CPU 702 may copy the application or portions of the application from the secondary storage 704 to the RAM 708 or to memory space within the CPU 702 itself, and the CPU 702 may then execute instructions that the application is comprised of. In some cases, the CPU 702 may copy the application or portions of the application from memory accessed via the network connectivity devices 712 or via the I/O devices 710 to the RAM 708 or to memory space within the CPU 702, and the CPU 702 may then execute instructions that the application is comprised of. During execution, an application may load instructions into the CPU 702, for example load some of the instructions of the application into a cache of the CPU 702. In some contexts, an application that is executed may be said to configure the CPU 702 to do something, e.g., to configure the CPU 702 to perform the function or functions promoted by the subject application. When the CPU 702 is configured in this way by the application, the CPU 702 becomes a specific purpose computer or a specific purpose machine.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC) or a field programmable gate array (FPGA), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 702 may execute a computer program or application. For example, the CPU 702 may execute software or firmware stored in the ROM 706 or stored in the RAM 708. In some cases, on boot and/or when the application is initiated, the CPU 702 may copy the application or portions of the application from the secondary storage 704 to the RAM 708 or to memory space within the CPU 702 itself, and the CPU 702 may then execute instructions that the application is comprised of. In some cases, the CPU 702 may copy the application or portions of the application from memory accessed via the network connectivity devices 712 or via the I/O devices 710 to the RAM 708 or to memory space within the CPU 702, and the CPU 702 may then execute instructions that the application is comprised of. During execution, an application may load instructions into the CPU 702, for example load some of the instructions of the application into a cache of the CPU 702. In some contexts, an application that is executed may be said to configure the CPU 702 to do something, e.g., to configure the CPU 702 to perform the function or functions promoted by the subject application. When the CPU 702 is configured in this way by the application, the CPU 702 becomes a specific purpose computer or a specific purpose machine.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards, and/or other well-known network devices. The network connectivity devices 712 may provide wired communication links and/or wireless communication links (e.g., a first network connectivity device 712 may provide a wired communication link and a second network connectivity device 712 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), Global System for Mobile Communications (GSM), LTE, WI-FI (IEEE 802.11), Bluetooth, ZigBee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), flash drive, ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of restoring an image of a computer, comprising:
   identifying, by a backup application executing on the computer, artifacts of the computer to back up;
   creating a mirror image of a hard drive of the computer, wherein the mirror image comprises the artifacts;
   establishing a local environment within the computer;
   communicating with a backup server, by the backup application, using the local environment in the computer;

backing up the mirror image, by the backup application, to the backup server using the local environment;

updating the mirror image, by the backup application, in the backup server in response to a change in the computer;

constructing the local environment on the computer in response to an event;

loading a program from the local environment, wherein the program instantiates a restore process for the computer; and restoring the computer, by the backup application, from the mirror image in the backup server based on the artifacts, the program, and the restore process.

2. The method of claim 1, wherein the local environment is a trusted execution environment (TEE).

3. The method of claim 1, wherein the backup server is within a virtual network function (VNF) slice of a fifth generation (5G) network.

4. The method of claim 1, wherein the event is in response to a reset of the computer, a prompt by another device, or a global reset from a network.

5. The method of claim 1, wherein communicating with the backup server using the local environment in the computer comprises further communicating with the backup server based on a subscription of the computer, wherein the subscription allows for access to the backup server.

6. The method of claim 1, wherein updating the mirror image in the backup server comprises:
determining the change, by the backup application, and identifying, by the backup application, the change is in response to a change in any of the artifacts; and
storing the change to the backup server.

7. The method of claim 1, wherein the artifacts comprise information of a micro kernel, a monolithic kernel, a hybrid kernel, a terminal controller, a device controller, a memory controller, a central processing unit (CPU) scheduler, a virtual memory, shells, a compiler, network access, application programs, resident system programs, device drivers, and read-only memory (ROM) basic input/output system (BIOS) device drivers.

8. A computer, comprising:
a processor; and
a non-transitory memory coupled to the processor; and
a backup application stored in the non-transitory memory that when executed by the processor,
identifies artifacts of the computer to back up;
creates a mirror image of a hard drive of the computer, wherein the mirror image comprises the artifacts;
establishes a local environment within the computer;
communicates with a backup server using the local environment in the computer;
backs up the mirror image to the backup server using the local environment;
updates the mirror image in the backup server in response to a change in the computer;
constructs the local environment on the computer in response to an event;
loads a program from the local environment, wherein the program instantiates a restore process for the computer; and
restores the computer, by the backup application, from the mirror image in the backup server based on the artifacts, the program, and the restore process.

9. The computer of claim 8, wherein the local environment is a trusted execution environment (TEE).

10. The computer of claim 8, wherein the artifacts comprise an operating system (OS), firmware, and a kernel of the computer.

11. The computer of claim 8, wherein the backup server is within in a virtual network function (VNF) slice of a fifth generation (5G) network.

12. The computer of claim 8, wherein the instructions that cause the processor to back up the mirror image do not rely on services, utilities, and system calls outside of the local environment.

13. The computer of claim 8, wherein the instructions that cause the processor to communicate with the backup server using the local environment in the computer further cause the processor to be configured to communicate with the backup server based on a subscription of the computer, wherein the subscription allows for access to the backup server.

14. The computer of claim 8, wherein by the backup application:
determines the change and identifying the change is in response to a change in any of the artifacts; and
stores the change to the backup server.

15. A method for backing up information, implemented by a mobile communication device, comprising:
identifying, by a backup application executing on the mobile communication device, artifacts of the mobile communication device to back up;
creating a mirror image of a hard drive of the mobile communication device, by the backup application, wherein the mirror image comprises the artifacts;
establishing a local environment within the mobile communication device;
communicating with a backup server, by the backup application, using the local environment in the mobile communication device;
backing up the mirror image, by the backup application, to the backup server using the local environment;
updating the mirror image, by the backup application, in the backup server in response to a change in the mobile communication device;
constructing the local environment on the mobile communication device in response to an event;
loading a program from the local environment, wherein the program instantiates a restore process for the mobile communication device; and
restoring the mobile communication device, by the backup application, from the mirror image in the backup server based on the artifacts, the program, and the restore process.

16. The method of claim 15, wherein the local environment is a trusted execution environment (TEE).

17. The method of claim 15, wherein the artifacts comprise information of system components, OS services, system calls, system programs, system structure, virtual machines, system design and implementation, Permanent Equipment Identifier (PEI), an International Mobile Equipment Identity (IMEI), a General Public Subscription Identifier (GPSI), a Mobile Station International Subscriber Directory Number (MSISDN), a Subscriber Permanent Identifier (SUPI), an International Mobile Subscriber Identity (IMSI), Network Access Identifier (NAI), Sub Concealed Identifier (SUCI), 5G-Temporary Mobile Subscriber Identifier (5G-TMSI), 5G-Globally Unique Temporary Identifier (5G-GUTI), and/or Globally Unique Access and Mobility Management Function (AMF) Identifier (GUAMI).

18. The method of claim 15, wherein the backup server is within a virtual network function (VNF) slice of a fifth generation (5G) network.

19. The method of claim 15, wherein communicating with the backup server using the local environment in the mobile communication device comprises further communicating with the backup server based on a subscription of the mobile communication device, wherein the subscription allows for access to the backup server.

20. The method of claim 15, wherein updating the mirror image in the backup server comprises:
- determining the change, by the backup application, and identifying, by the backup application, the change is in response to a change in any of the artifacts; and
- storing the change, by the backup application, to the backup server.

\* \* \* \* \*